(12) United States Patent
Lv et al.

(10) Patent No.: US 11,815,156 B2
(45) Date of Patent: Nov. 14, 2023

(54) SHOCK ABSORBER AND TRANSPORTATION TOOL

(71) Applicant: Ninebot (Changzhou) Tech Co., Ltd., Jiangsu (CN)

(72) Inventors: Ronghui Lv, Jiangsu (CN); Huocheng Wei, Jiangsu (CN); Can Wang, Jiangsu (CN)

(73) Assignee: NINEBOT (CHANGZHOU) TECH CO., LTD., Jiangsu (CN)

( * ) Notice: Subject to any disclaimer, the term of this patent is extended or adjusted under 35 U.S.C. 154(b) by 0 days.

(21) Appl. No.: 17/583,876

(22) Filed: Jan. 25, 2022

(65) Prior Publication Data

US 2022/0268333 A1  Aug. 25, 2022

(30) Foreign Application Priority Data

Feb. 25, 2021 (CN) .......................... 202120423538.9

(51) Int. Cl.
| | | |
|---|---|---|
| *B62K 25/00* | (2006.01) | |
| *F16F 1/14* | (2006.01) | |
| *F16F 7/10* | (2006.01) | |

(52) U.S. Cl.
CPC ................ *F16F 7/10* (2013.01); *B62K 25/00* (2013.01); *F16F 1/14* (2013.01); *B62K 2202/00* (2013.01)

(58) Field of Classification Search
CPC .......... B62K 25/00; B62K 25/04; F16F 1/14; B60G 11/18
See application file for complete search history.

(56) References Cited

U.S. PATENT DOCUMENTS

| | | | | |
|---|---|---|---|---|
| 6,270,103 B1* | 8/2001 | Grimm | ..................... | B62M 6/65 |
| | | | | 280/281.1 |
| 6,325,327 B1* | 12/2001 | Zoppitelli | ................ | F16F 7/116 |
| | | | | 244/54 |
| 6,341,768 B1* | 1/2002 | Kao | ........................ | B62K 25/28 |
| | | | | 280/283 |
| 8,360,448 B2* | 1/2013 | Lariviere | .............. | B60G 11/225 |
| | | | | 280/124.167 |
| 2012/0025484 A1* | 2/2012 | Masi | ..................... | F16F 1/3863 |
| | | | | 280/124.13 |

(Continued)

FOREIGN PATENT DOCUMENTS

| | | |
|---|---|---|
| CN | 2421191 Y | 2/2001 |
| CN | 103144727 A | 6/2013 |

(Continued)

OTHER PUBLICATIONS

Extended European Search Report dated Jul. 18, 2022, for corresponding European Application No. 22151340.1.

Primary Examiner — Jacob D Knutson
Assistant Examiner — Hosam Shabara
(74) Attorney, Agent, or Firm — David D. Brush; Westman, Champlin & Koehler, P.A.

(57) ABSTRACT

A shock absorber and a transportation tool. The shock absorber includes a first rotating arm; a second rotating arm pivotally coupled to the first rotating arm; and a torsion bar spring having a first end coupled to the first rotating arm and a second end coupled to the second rotating arm, wherein an included angle between the first rotating arm and the rotating arm has a set value. The shock absorber has a simple structure and good shock absorption effect and adjustable stroke.

17 Claims, 9 Drawing Sheets

(56) References Cited

U.S. PATENT DOCUMENTS

2022/0266943 A1\* 8/2022 Lv .......................... F16F 1/545

FOREIGN PATENT DOCUMENTS

| CN | 203142933 U | \* | 8/2013 | |
|---|---|---|---|---|
| CN | 103144727 B | \* | 10/2015 | |
| CN | 103747706 B | \* | 8/2017 | ............. A47C 1/023 |
| CN | 105270123 B | \* | 12/2018 | ........... B60G 11/181 |
| DE | 1084599 B | | 6/1960 | |
| GB | 2175073 A | | 11/1986 | |
| KR | 20100042360 A | \* | 4/2010 | |

\* cited by examiner

SHOCK ABSORBER AND TRANSPORTATION TOOL

CROSS-REFERENCE TO RELATED APPLICATION

The present application is based on and claims priority to Chinese Patent Application Serial No. 202120423538.9, filed on Feb. 25, 2021, the entire content of which is incorporated herein by reference.

FIELD

The present disclosure relates to a technical field of electric scooters, and more particularly, to a shock absorber and a transportation tool.

BACKGROUND

Use of transportation tools such as scooters is rising year by year in people's daily travel, and they are deeply loved by young consumers due to their dexterity and portability. Shock absorbers in the transportation tools of the related art have complex structures, high manufacturing cost, and poor shock absorption effect. Moreover, the shock absorbers cannot change the stroke, which results in poor riding experience for riders.

SUMMARY

The present disclosure aims to solve at least one technical problem existing in the related art.

Accordingly, embodiments of the present disclosure propose a shock absorber that has a simple structure and good shock absorption effect.

The shock absorber according to embodiments of the present disclosure includes: a first rotating arm; a second rotating arm pivotally coupled to the first rotating arm; and a torsion bar spring having a first end coupled to the first rotating arm and a second end coupled to the second rotating arm, wherein an included angle between the first rotating arm and the second rotating arm has a set value.

For the shock absorber according to embodiments of the present disclosure, when a wheel encounters a bumpy road and vibrates, the first rotating arm and the second rotating arm may pivot relative to each other, and in turn the torsion bar spring undergoes torsional deformation, thereby achieving absorption of the vibration. Compared with shock absorbers having compression springs in the related art, the shock absorber according to the embodiments of the present disclosure has a simple structure and good shock absorption effect and is more comfortable.

Embodiments of a second aspect of the present disclosure propose a transportation tool. The transportation tool includes a wheel configured as either of a front wheel and a rear wheel; and the shock absorber. The shock absorber includes a first rotating arm; a second rotating arm pivotally coupled to the first rotating arm; and a torsion bar spring having a first end coupled to the first rotating arm and a second end coupled to the second rotating arm, wherein an included angle between the first rotating arm and the second rotating arm has a set value, and the first rotating arm is coupled to a rotating shaft of the wheel.

For the transportation tool according to the embodiments of the present disclosure, when the wheel encounters a bumpy road and vibrates, the first rotating arm and the second rotating arm may pivot relative to each other, and in turn the torsion bar spring undergoes torsional deformation, thereby achieving absorption of the vibration. Compared with shock absorbers having compression springs in the related art, the shock absorber according to the embodiments of the present disclosure has a simple structure and good shock absorption effect and is more comfortable. Moreover, the front wheel and the rear wheel may be both coupled to the shock absorber, that is, the shock absorber may realize the shock absorption for the front wheel and the rear wheel, resulting in better applicability.

DETAILED DESCRIPTION

Embodiments of the present disclosure will be described in detail below, and examples of the embodiments are illustrated in the accompanying drawings. The embodiments described with reference to the drawings are exemplary and are intended to explain the present disclosure rather than limit the present disclosure.

A shock absorber according to embodiments of the present disclosure will be described below with reference to FIGS. 1-10.

As illustrated in FIGS. 1 to 9, the shock absorber according to the embodiments of the present disclosure includes a first rotating arm 1, a second rotating arm 2, and a torsion bar spring 3. The first rotating arm 1 and the second rotating arm 2 are pivotally coupled, and an included angle between the first rotating arm 1 and the second rotating arm 2 has a set value. The torsion bar spring 3 has a first end 301 coupled to the first rotating arm 1 and a second end 302 coupled to the second rotating arm 2.

Figure 1:
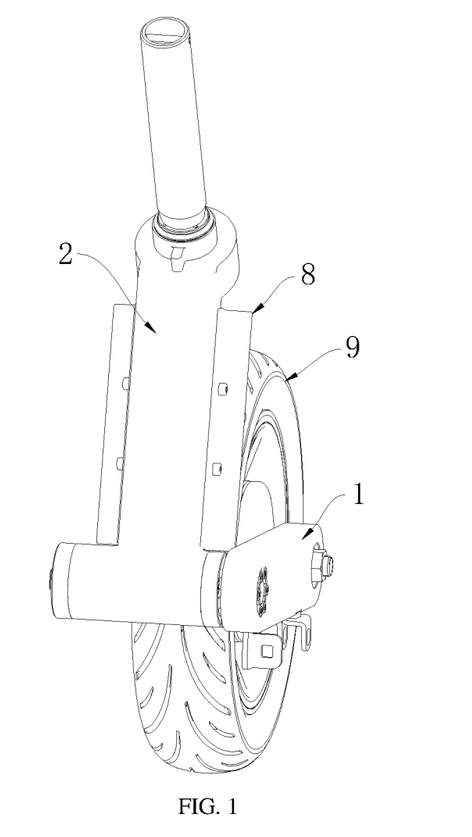
FIG. 1 is a schematic view of a shock absorber according to a first embodiment of the present disclosure.
Figure 2:
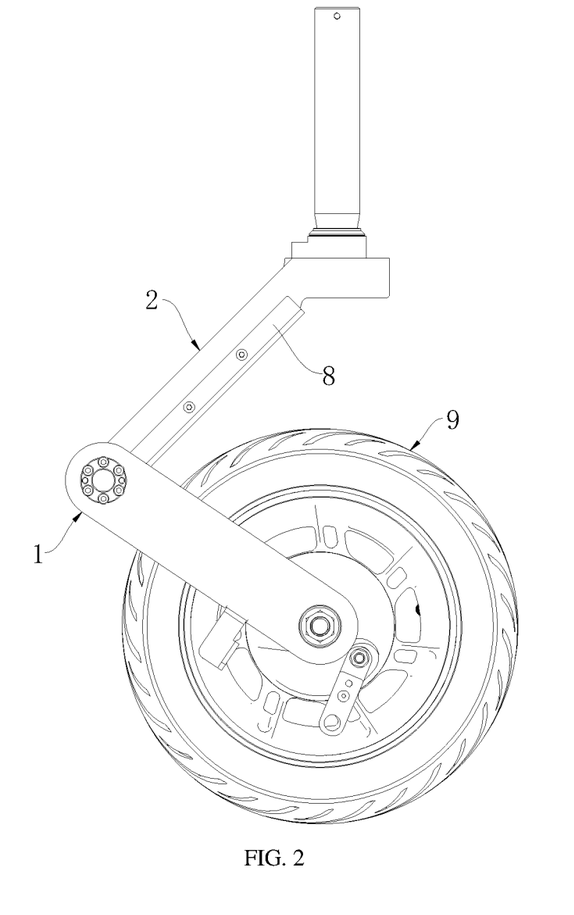
FIG. 2 is a right view of the shock absorber according to the first embodiment of the present disclosure.

As illustrated in FIGS. 1 and 2, an upper end of the first rotating arm 1 and a lower end of the second rotating arm 2 are pivotally coupled, and the first rotating arm 1 and the second rotating arm 2 are arranged at an angle. When the first rotating arm 1 rotates relative to the second rotating arm 2, the torsion bar spring 3 undergoes torsional deformation. When it is not impacted by an external force, that is, when the torsion bar spring 3 basically undergoes no torsional deformation, an included angle between the first rotating arm 1 and the second rotating arm 2 is the set value.

For the shock absorber according to the embodiments of the present disclosure, when a wheel 9 encounters a bumpy road and vibrates, the first rotating arm 1 and the second rotating arm 2 is able to pivot relative to each other, such that the torsion bar spring 3 undergoes the torsional deformation, thereby achieving absorption of the vibration. Compared with shock absorbers having compression springs in the related art, the shock absorber according to the embodiments of the present disclosure has a simple structure and good shock absorption effect and is more comfortable.

In some embodiments, the included angle between the first rotating arm 1 and the second rotating arm 2 has a first critical value and a second critical value, and the set value is any value between the first critical value and the second critical value.

That is, when the torsion bar spring 3 basically undergoes no torsional deformation, the included angle between the first rotating arm 1 and the second rotating arm 2 may be any value between the first critical value and the second critical value. In other words, the stroke of the shock absorber may be adjusted infinitely without the need to replace the torsion bar spring 3, which is convenient and flexible. The stroke here may be understood as a height of an upper end of the second rotating arm 2 when the included angle between the first rotating arm 1 and the second rotating arm 2 is the set value, or as a height of a transportation tool when the included angle between the first rotating arm 1 and the second rotating arm 2 is the set value. Therefore, more road conditions may be satisfied, and the shock absorber is convenient to maintain.

In some embodiments, the first rotating arm 1 is defined with a first connecting hole 101, the shock absorber further includes an expansion sleeve 4, and the expansion sleeve 4 includes an outer expansion sleeve 401 and an inner expansion sleeve 402. The outer expansion sleeve 401 is fitted in the first connecting hole 101, the inner expansion sleeve 402 is fitted in the outer expansion sleeve 401, and the first end 301 of the torsion bar spring 3 is fitted in the inner expansion sleeve 402.

As illustrated in FIGS. 2 to 5, the first connecting hole 101 is a circular hole, the outer expansion sleeve 401 is fitted in the first connecting hole 101, and at least a part of the inner expansion sleeve 402 is frustum-shaped. As the inner expansion sleeve 402 is at least partially fitted in the outer expansion sleeve 401, the inner expansion sleeve 402 compresses the first end 301 of the torsion bar spring 3 and the outer expansion sleeve 401, and the outer expansion sleeve 401 compresses an inner peripheral wall of the first connecting hole 101. In this way, the first end 301 of the torsion bar spring 3 and the first rotating arm 1 are fixed relative to each other. Moreover, the first end 301 of the torsion bar spring 3 may be easily disassembled from the first rotating arm 1, and the included angle between the first rotating arm 1 and the second rotating arm 2 may be adjusted freely, to realize indefinite adjustment for the stroke of the shock absorber, which is simple and convenient.

Figure 3:
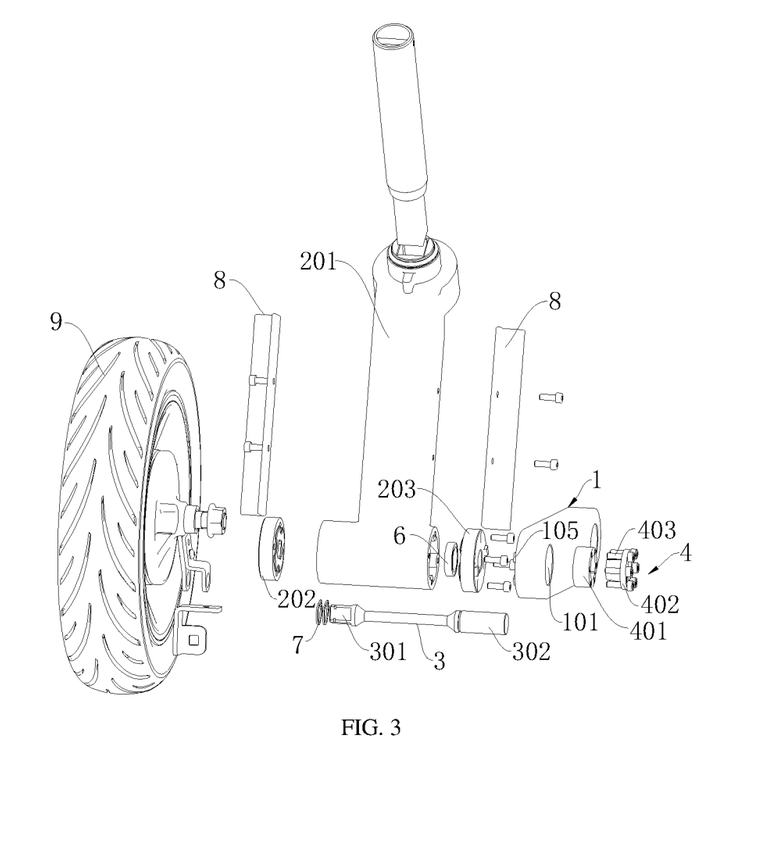
FIG. 3 is an exploded view of the shock absorber according to the first embodiment of the present disclosure.

In some embodiments, as illustrated in FIG. 3, the expansion sleeve 4 further includes a first bolt 403, the inner expansion sleeve 402 is provided with a limiting flange, and the limiting flange is defined with a second connecting hole. There are a plurality of second connecting holes equally spaced along a peripheral direction of the limiting flange. The outer expansion sleeve 401 is defined with a first threaded hole. There are a plurality of first threaded holes in one-to-one correspondence with the second connecting holes. The first bolt 403 passes through the second connecting hole and is threadedly fitted with the corresponding first threaded hole, so as to ensure that the inner expansion sleeve 402 is stably fitted in the outer expansion sleeve 401, and further ensure the stability of the fixed connection between the torsion bar spring 3 and the first rotating arm 1.

Figure 4:
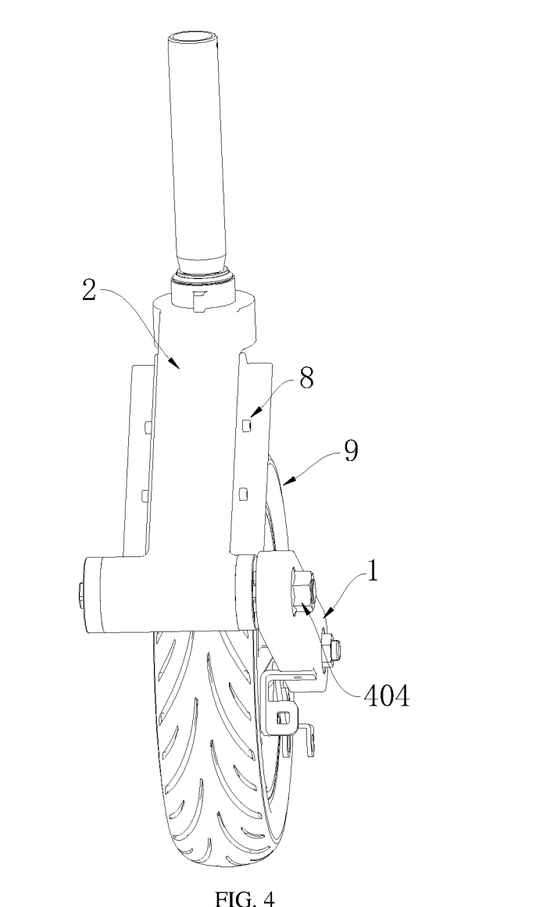
FIG. 4 is a schematic view of a shock absorber according to a second embodiment of the present disclosure.
Figure 5:
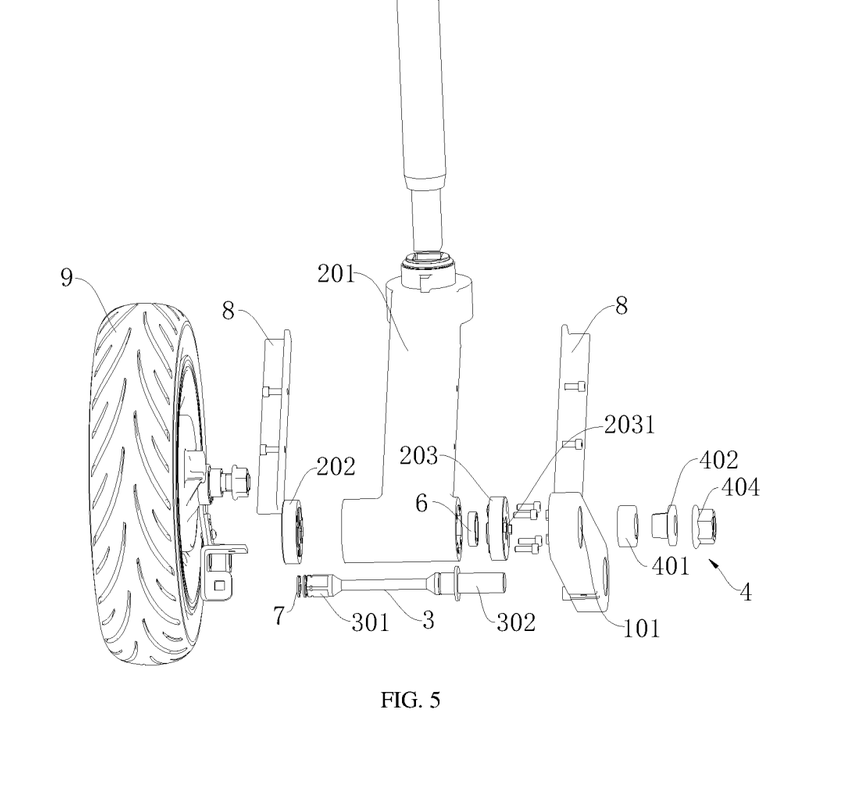
FIG. 5 is an exploded view of the shock absorber according to the second embodiment of the present disclosure.

In some embodiments, as illustrated in FIGS. 4 and 5, the expansion sleeve 4 may further include a stop nut 404, the first end 301 of the torsion bar spring 3 is provided with an external thread, and the stop nut 404 is threadedly fitted with the first end 301 of the torsion bar spring 3 and stops the inner expansion sleeve 402. In this way, it may also be ensured that the inner expansion sleeve 402 is stably fitted in the outer expansion sleeve 401, thereby ensuring the stability of the fixed connection between the torsion bar spring 3 and the first rotating arm 1.

In some embodiments, the included angle between the first rotating arm 1 and the second rotating arm 2 has a first critical value and a second critical value. There are a plurality of set values discretely distributed between the first critical value and the second critical value.

That is, the shock absorber may have the same number of strokes as the set value, without the need to replace the torsion bar spring 3, and the plurality of strokes may also satisfy most road conditions to upgrade rider experience.

In some embodiments, the first connecting hole 101 is defined on the first rotating arm 1, and the first end 301 of the torsion bar spring 3 is clamped in the first connecting hole 101. The term "clamped" here refers to that after one end of the torsion bar spring 3 is fitted in the first connecting hole 101, the torsion bar spring 3 and the first rotating arm 1 cannot pivot relative to each other. One of the first end 301 of the torsion bar spring 3 and the first connecting hole 101 has a cross-sectional shape in a rotationally symmetric pattern. That is, the torsion bar spring 3 coincides with its initial pattern after rotating around its axis by a certain angle. The rotationally symmetrical pattern includes at least two symmetrical portions, and the number of the symmetrical portions is the number of the set values.

The other one of the first end 301 of the torsion bar spring 3 and the first connecting hole 101 has a cross-sectional shape composed of at least one symmetrical portion. That is, the torsion bar spring 3 may be likewise clamped in the first connecting hole 101 after rotating around its axis by a set angle (the second rotating arm 2 coupled to the torsion bar spring 3 pivots as well). As a result, the set value (the included angle between the first rotating arm 1 and the second rotating arm 2) may be changed, i.e., realizing the adjustment for the stroke of the shock absorber.

In some embodiments, the cross-sectional shape of the first end 301 of the torsion bar spring 3 and the cross-sectional shape of the first connecting hole 101 are both regular polygons that match each other. In such a case, the number of sides of the regular polygon is the number of set values. Thus, the formation and adjustment method of the shock absorber is simple and quick, and the shock absorber has a simple structure and is easy to maintain.

Specifically, the cross-sectional shape of the first end 301 of the torsion bar spring 3 and the cross-section of the first connecting hole 101 are any one of a regular triangle, a square, a regular pentagon, a regular hexagon, and the like.

In some embodiments, the cross-sectional shape of the first end 301 of the torsion bar spring 3 and the cross-section of the first connecting hole 101 may also be rhombus, ellipse, or other rotationally symmetrical patterns composed of arcs and straight lines (for example, two opposite sides of a rectangle are replaced with arcs that share a common center of a circle).

As illustrated in FIGS. 6-9, in some embodiments, an outer peripheral surface of the first end 301 of the torsion bar spring 3 is provided with a flat key, and an inner peripheral surface of the first connecting hole 101 is provided with an internal spline 102. The flat key may be clamped with any key groove formed by the internal spline 102. In some embodiments, the outer peripheral surface of the first end 301 of the torsion bar spring 3 is provided with an external spline, and the inner peripheral surface of the first connecting hole 101 is provided with a flat key, and the flat key may be clamped with any key groove formed by the external spline. In some embodiments, the outer peripheral surface of the first end 301 of the torsion bar spring 3 is provided with an outer spline, and the inner peripheral surface of the first connecting hole 101 is provided with an inner spline 102 clamped with the outer spline.

That is, one of the first end 301 of the torsion bar spring 3 and the cross-section of the first connecting hole 101 has a cross-sectional shape equivalent to a cross-sectional shape of a spline, and the other one thereof has a cross-sectional shape equivalent to a cross-sectional shape of a flat key. As a result, it is also possible to achieve definite adjustment for the stroke of the shock absorber.

Similarly, one of the first end 301 of the torsion bar spring 3 and the cross-section of the first connecting hole 101 may have a cross-sectional shape equivalent to a cross-sectional shape of a gear, and the other one thereof has a cross-sectional shape equivalent to a cross-sectional shape of at least one tooth of a gear.

In some embodiments, the shock absorber further includes a first snap spring, and the first end 301 of the torsion bar spring 3 is provided with a first snap slot. A part, provided with the first snap slot, of the first end 301 of the torsion bar spring 3 passes through the first connecting hole 101, the first snap spring is snapped in the first snap slot, and the first snap spring abuts against a side of the first rotating arm 1 facing away from the second rotating arm 2. Therefore, the torsion bar spring 3 may be prevented from falling out of the first connecting hole 101, and the torsion bar spring 3 is restricted in its axial direction.

In some embodiments, the shock absorber further includes a second bolt 5, and the first rotating arm 1 includes a main body portion 103 and a pressing portion 104. The first connecting hole 101 is defined between the main body portion 103 and the pressing portion 104, the pressing portion 104 is defined with a third connecting hole, and the main body portion 103 is defined with a second threaded hole. The pressing portion 104 presses the first end 301 of the torsion bar spring 3, by the second bolt 5 passing through the third connecting hole and threadedly fitted with the second threaded hole.

Figure 6:
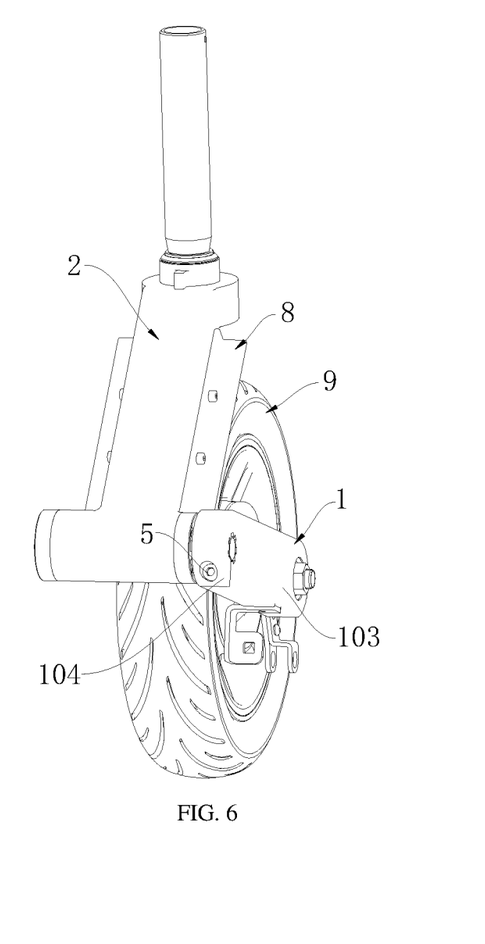
FIG. 6 is a schematic view of a shock absorber according to a third embodiment of the present disclosure.
Figure 7:
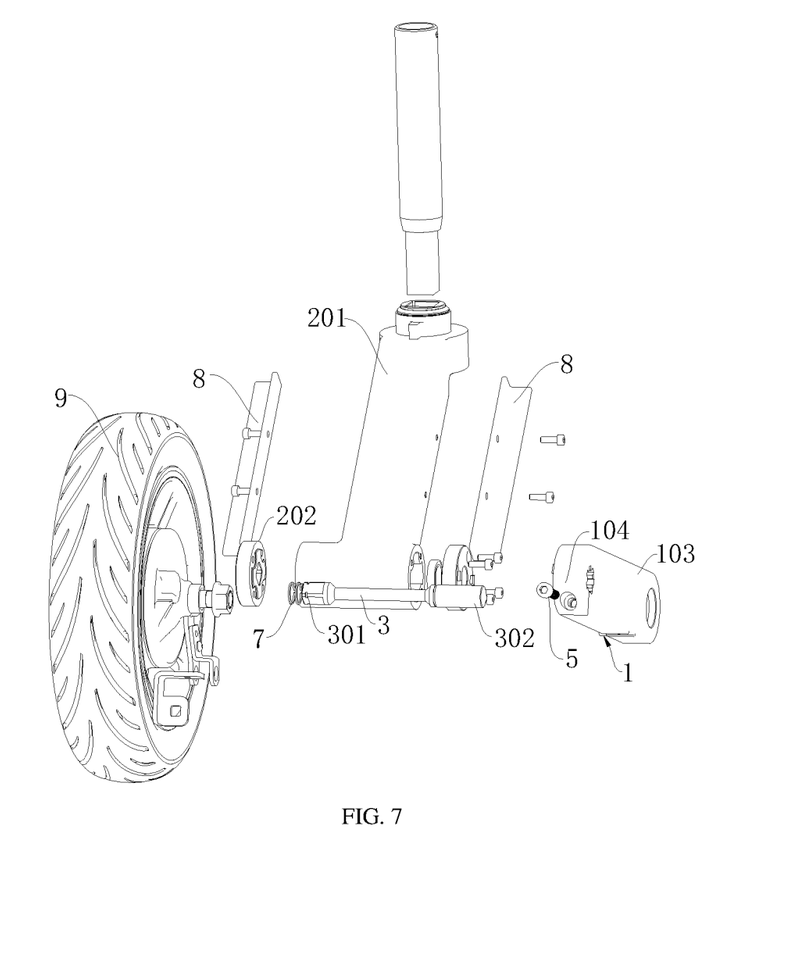
FIG. 7 is an exploded view of the shock absorber according to the third embodiment of the present disclosure.

As illustrated in FIGS. 5 and 6, the main body portion 103 and the pressing portion 104 are integrally formed, and a gap extending in a radial direction of the first connecting hole 101 is formed at a junction between the main body portion 103 and the pressing portion 104. When the first end 301 of the torsion bar spring 3 is clamped in the first connecting hole 101, the second bolt 5 may compress the pressing portion 104 toward the main body portion 103 to reduce a width of the gap, and in turn the main body portion 103 and the pressing portion 104 may compress the first end 301 of the torsion bar spring 3, to realize relative fixation of the torsion bar spring 3 and the first rotating arm 1, especially in an axial direction of the torsion bar spring 3.

Figure 8:
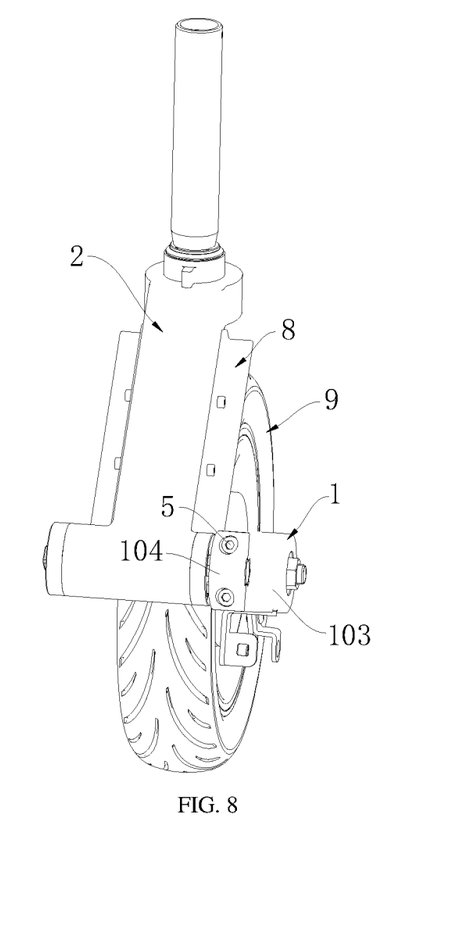
FIG. 8 is a schematic view of a shock absorber according to a fourth embodiment of the present disclosure.
Figure 9:
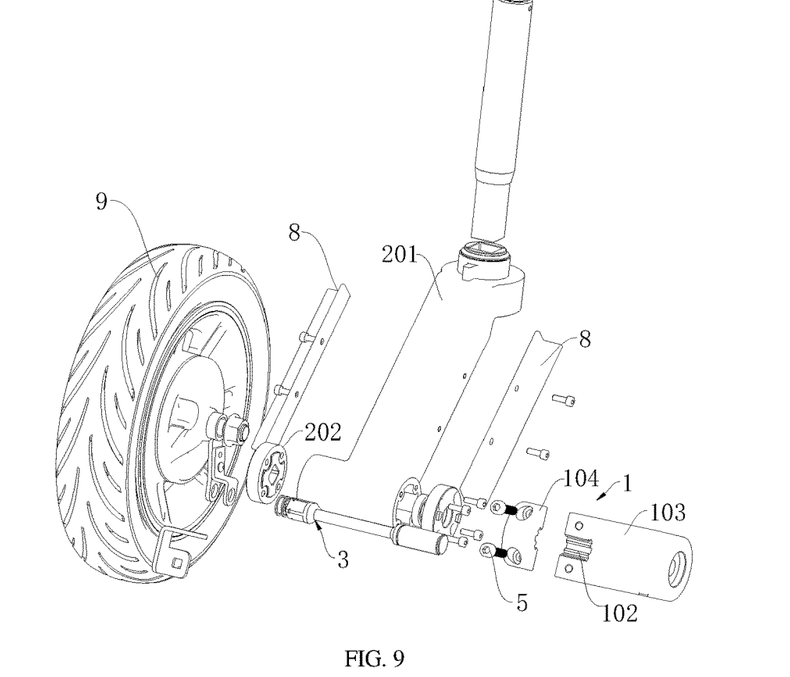
FIG. 9 is an exploded view of the shock absorber according to the fourth embodiment of the present disclosure.

As illustrated in FIGS. 8 and 9, the main body portion 103 and the pressing portion 104 are separately arranged. In such a case, the second bolt 5 may also enable the pressing portion 104 to approach the main body portion 103 to compress the first end 301 of the torsion bar spring 3, to realize relative fixation of the torsion bar spring 3 and the first rotating arm 1, especially in the axial direction of the torsion bar spring 3.

In some embodiments, a side of the first rotating arm 1 facing the second rotating arm 2 is provided with a first limiting protrusion 105, and a side of the second rotating arm 2 facing the first rotating arm 1 is provided with a second limiting protrusion 2031. There are at least two first limiting protrusions 105 and/or at least two second limiting protrusions 2031. When the included angle between the first rotating arm 1 and the second rotating arm 2 is the first critical value or the second critical value, the first limiting protrusion 105 abuts against the second limiting protrusion 2031.

As illustrated in FIGS. 3 and 5, there are two first limiting protrusions 105 and two second limiting protrusions 2031 in one-to-one correspondence. When the included angle between the first rotating arm 1 and the second rotating arm 2 is the first critical value, the two first limiting protrusions 105 simultaneously abut against respective first side surfaces of the corresponding second limiting protrusions 2031. When the included angle between the first rotating arm 1 and the second rotating arm 2 is the second critical value, the two first limiting protrusions 105 simultaneously abut against respective second side surfaces of the corresponding second limiting protrusions 2031. The first side surface and the second side surface of each second limiting protrusion 2031 are opposite to each other in a peripheral direction of the torsion bar spring 3.

By arranging the first critical value and the second critical value, it is possible to avoid any dead point between the first rotating arm 1 and the second rotating arm 2 effectively (the included angle between the first rotating arm 1 and the second rotating arm 2 is 0° or 180°), and control the torsional deformation of the torsion bar spring 3 within an appropriate range to ensure the performance and service life of the torsion bar spring 3.

In some embodiments, one of the first rotating arm 1 and the second rotating arm 2 is provided with a channel, and a middle part of the torsion bar spring 3 is located in the channel A bearing 6 or a shaft sleeve is fitted in the channel, and the middle part of the torsion bar spring 3 is fitted in the bearing 6 or the shaft sleeve. Therefore, it is ensured that the torsion bar spring 3 is basically isolated from the outside, to prevent external impurities from affecting the torsional deformation of the torsion bar spring 3. Moreover, by arranging the bearing 6 or the shaft sleeve, the torsion bar spring 3 may be radially supported to ensure its radial stability without affecting the torsional deformation of the torsion bar spring 3.

It should be noted that the present embodiment may realize the pivotal connection of the first rotating arm 1 and the second rotating arm 2 by the torsion bar spring 3 alone. The first rotating arm 1 and the second rotating arm 2 may be pivotally coupled by a pivot shaft that is a hollow shaft, and the torsion bar spring 3 is fitted in the pivot shaft. Thus, the torsion bar spring 3 basically does not need to bear any radial load, thereby further ensuring the performance and service life of the torsion bar spring 3.

In some embodiments, the second rotating arm 2 includes an arm body 201, a first end cap 202, and a second end cap 203. The channel is arranged on the arm body 201 and runs through the second rotating arm 2 in the axial direction of the torsion bar spring 3. The first end cap 202 is coupled to the arm body 201 and located on a side of the arm body 201 facing away from the first rotating arm 1. The second end cap 203 is coupled to the arm body 201 and located on a side of the arm body 201 facing the second rotating arm 2. The second end cap 203 is defined with a through hole for the torsion bar spring 3 to pass through, and the second end 302 of the torsion bar spring 3 is coupled to the first end cap 202.

Thus, the installation of the torsion bar spring 3 and the bearing 6 (or the shaft sleeve) may be facilitated since the channel is configured to have two open ends. The first end cap 202 and the second end cap 203 prevent the bearing 6 or the shaft sleeve from falling out of the channel, and also prevent foreign impurities from entering the channel.

In some embodiments, the first end cap 202 is defined with a fourth connecting hole, and the second end 302 of the torsion bar spring 3 is provided with a second snap slot. The second end 302 of the torsion bar spring 3 is clamped in the fourth connecting hole. A part, provided with the second snap slot, of the second end 302 of the torsion bar spring 3 passes through the fourth connecting hole, and the second snap spring 7 is snapped in the second snap slot.

As illustrated in FIG. 3, the second end 302 of the torsion bar spring 3 substantially has a square cross-sectional shape, and the fourth connecting hole is a square hole that matches the second end 302 of the torsion bar spring 3. The second end 302 of the torsion bar spring 3 is fitted in the fourth connecting hole, to realize relative fixation of the torsion bar spring 3 and the second rotating arm 2 in the peripheral direction of the torsion bar spring 3. The part, provided with the second snap slot, of the second end 302 of the torsion bar spring 3 passes through the fourth connecting hole, and the second snap spring 7 is snapped in the second snap slot and abuts against the side of the arm body 201 facing away from the first rotating arm 1, to realize relative fixation of the torsion bar spring 3 and the second rotating arm 2 in the axial direction of the torsion bar spring 3.

It should be noted that the connection method between the second end 302 of the torsion bar spring 3 and the second rotating arm 2 may be any kind of various methods for connection between the first end 301 of the torsion bar spring 3 and the first rotating arm 1 described above. That is, it is also possible to realize adjustment of the stroke of the shock absorber by adjusting the connection relationship between the second end 302 of the torsion bar spring 3 and the second rotating arm 2.

The shock absorber according to a specific example of the embodiments of the present disclosure will be described below with reference to FIGS. 1 to 3.

As illustrated in FIGS. 1 to 3, the shock absorber includes a first rotating arm 1, a second rotating arm 2, a torsion bar spring 3, an expansion sleeve 4, a first bolt 403, and a second snap spring 7.

The first rotating arm 1 is defined with a first connecting hole 101, and the first connecting hole 101 is a circular hole. The expansion sleeve 4 includes an outer expansion sleeve 401 and an inner expansion sleeve 402. The outer expansion sleeve 401 is fitted in the first connecting hole 101, and the first end 301 of the torsion bar spring 3 is fitted in the inner expansion sleeve 402. A second connecting hole is defined on the inner expansion sleeve 402, and a first threaded hole is defined on the outer expansion sleeve 401. The inner expansion sleeve 402 is fitted in the outer expansion sleeve 401, by the first bolt 403 passing through the second connecting hole and threadedly fitted with the first threaded hole, to realize relative fixation of the first end 301 of the torsion bar spring 3 and the first rotating arm 1.

The second rotating arm 2 includes an arm body 201, a first end cap 202, and a second end cap 203. The first end cap 202 is installed on a side of the arm body 201 facing away from the first rotating arm 1, and the second end cap 203 is installed on a side of the arm body 201 facing the second rotating arm 2. A lower end of the arm body 201 is provided with a channel running through the arm body 201 along an axial direction of the torsion bar spring 3, and a bearing 6 is fitted in the channel. The torsion bar spring 3 extends from a through hole of the second end cap 203 into the channel and is fitted with the bearing 6. A part, provided with a second snap slot, of the second end 302 of the torsion bar spring 3 protrudes out of the channel, and the second snap spring 7 is snapped in the second snap slot, to realize the relative fixation of the second end 302 of the torsion bar spring 3 and the second rotating arm 2.

Figure 10:
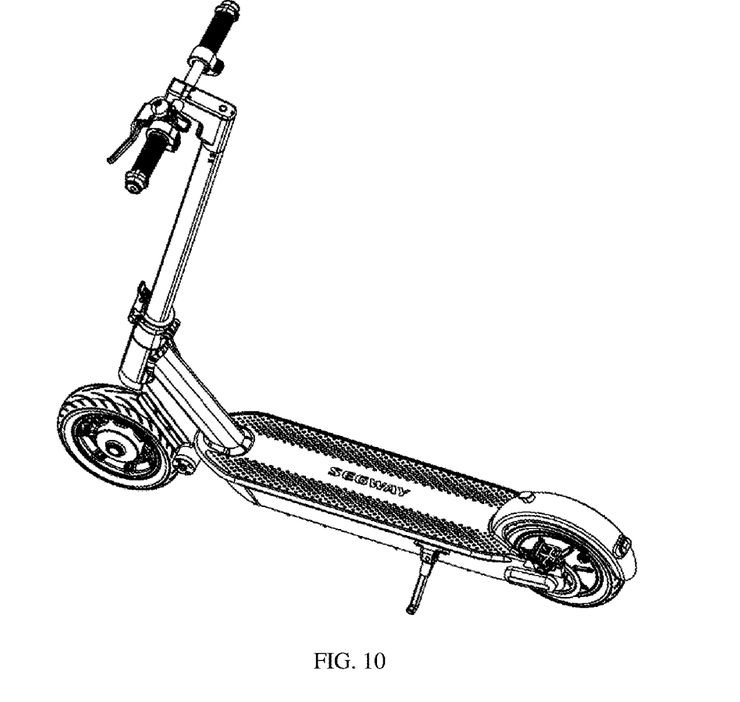
FIG. 10 is a perspective view of a transportation tool according to an embodiment of the present disclosure.

A transportation tool according to embodiments of a second aspect of the present disclosure includes a wheel 9 and the shock absorber according to any of the above embodiments. The wheel 9 is either a front wheel or a rear wheel, and the first rotating arm 1 is coupled to a rotating shaft of the wheel 9.

For the transportation tool according to the embodiments of the present disclosure, when the wheel 9 encounters a bumpy road and vibrates, the first rotating arm 1 and the second rotating arm 2 may pivot relative to each other, and in turn the torsion bar spring 3 undergoes torsional deformation, thereby achieving absorption of the vibration. Compared with shock absorbers having compression springs in the related art, the shock absorber according to the embodiments of the present disclosure has a simple structure and good shock absorption effect and is more comfortable. Moreover, the front wheel and the rear wheel may be both coupled to the shock absorber, that is, the shock absorber may realize the shock absorption for the front wheel and the rear wheel, resulting in better applicability.

In some embodiments, the transportation tool further includes a mudguard 8 installed on the second rotating arm 2. As illustrated in FIGS. 1-9, two mudguards 8 are coupled to both sides of the second rotating arm 2 by bolts, thereby avoiding splashing of muddy water brought up by the wheel 9.

In some embodiments, the transportation tool includes an electric scooter. The present disclosure is not limited thereto, and for example, the transportation tool may also be a bicycle.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as illustrated in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly comprise one or more of this feature. In the description of the present disclosure, the term "a plurality of" means at least two, such as two, three, etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communicate with each other; may also be direct connections or indirect connections via intervening structures; may also be inner communication or interaction of two elements, which may be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples. Moreover, those skilled in the art may integrate and combine the different embodiments or examples and the features of the different embodiments or examples described in this specification without contradicting each other.

Although embodiments of the present disclosure have been illustrated and described, it may be appreciated by those skilled in the art that the above embodiments are merely exemplary and are not intended to limit the present disclosure, and various changes, modifications, alternatives and variations may be made in the embodiments within the scope of the present disclosure.

What is claimed is:

1. A shock absorber comprising:
    a first rotating arm which is defined with a first connecting hole;
    a second rotating arm pivotally coupled to the first rotating arm; and
    a torsion bar spring having a first end coupled to the first rotating arm and a second end coupled to the second rotating arm,
    wherein when the torsion bar spring undergoes no torsional deformation, an included angle between the first rotating arm and the second rotating arm has a set value,
    wherein the included angle between the first rotating arm and the second rotating arm has a first critical value and a second critical value, and the set value is any value between the first critical value and the second critical value,
    wherein the shock absorber further comprises an expansion sleeve; the expansion sleeve comprises an outer expansion sleeve fitted in the first connecting hole and an inner expansion sleeve fitted in the outer expansion sleeve; and the first end of the torsion bar spring is fitted in the inner expansion sleeve, and
    wherein the expansion sleeve further comprises a first bolt, the inner expansion sleeve is provided with a limiting flange, the outer expansion sleeve is provided with a first threaded hole, and a second connecting hole is defined on the limiting flange, the first bolt passes through the second connecting hole and is threadedly fitted with the first threaded hole.

2. The shock absorber according to claim 1, wherein there are a plurality of set values discretely distributed between the first critical value and the second critical value.

3. The shock absorber according to claim 2, wherein the first end of the torsion bar spring is clamped in the first connecting hole; and
    wherein one of the first end of the torsion bar spring and the first connecting hole has a cross-sectional shape in a rotationally symmetric pattern, and the rotationally symmetrical pattern comprises at least two symmetrical portions; and the other one of the first end of the torsion bar spring and the first connecting hole has a cross-sectional shape composed of at least one symmetrical portion.

4. The shock absorber according to claim 3, wherein the cross-sectional shape of the first end of the torsion bar spring and the cross-sectional shape of the first connecting hole are regular polygons that match each other.

5. The shock absorber according to claim 3, wherein an outer peripheral surface of the first end of the torsion bar spring is provided with a flat key, and an inner peripheral surface of the first connecting hole is provided with an internal spline, the flat key is able to be clamped with any key groove formed by the internal spline; or
    an outer peripheral surface of the first end of the torsion bar spring is provided with an external spline, and an inner peripheral surface of the first connecting hole is provided with a flat key, the flat key is able to be clamped with any key groove formed by the external spline; or
    an outer peripheral surface of the first end of the torsion bar spring is provided with an outer spline, and an inner peripheral surface of the first connecting hole is provided with an inner spline configured to be clamped with the outer spline.

6. The shock absorber according to claim 3, wherein the shock absorber further comprises a first snap spring, and the first end of the torsion bar spring is provided with a first snap slot; and wherein a part, provided with the first snap slot, of the first end of the torsion bar spring passes through the first connecting hole, and the first snap spring is snapped in the first snap slot.

7. The shock absorber according to claim 3, wherein the shock absorber further comprises a second bolt, and the first rotating arm comprises a main body portion and a pressing portion; wherein the first connecting hole is defined between the main body portion and the pressing portion, the pressing portion is defined with a third connecting hole, and the main body portion is defined with a second threaded hole; and wherein the pressing portion presses the first end of the torsion bar spring, by the second bolt passing through the third connecting hole and threadedly fitted with the second threaded hole.

8. The shock absorber according to claim 7, wherein the main body portion and the pressing portion are integrally formed, and a gap extending in a radial direction of the first connecting hole is formed at a junction between the main body portion and the pressing portion, when the first end of the torsion bar spring is clamped in the first connecting hole, the second bolt is able to compress the pressing portion toward the main body portion to reduce a width of the gap, and in turn the main body portion and the pressing portion compresses the first end of the torsion bar spring.

9. The shock absorber according to claim 7, wherein the main body portion and the pressing portion are separately arranged, the second bolt enables the pressing portion to approach the main body portion to compress the first end of the torsion bar spring.

10. The shock absorber according to claim 1, wherein a side of the first rotating arm facing the second rotating arm is provided with a first limiting protrusion, and a side of the second rotating arm facing the first rotating arm is provided with a second limiting protrusion; and wherein the first limiting protrusion is configured to abut against the second limiting protrusion when the included angle between the first rotating arm and the second rotating arm is the first critical value or the second critical value;
wherein
there are at least two first limiting protrusions; or
there are at least two second limiting protrusions; or
there are at least two first limiting protrusions and at least two second limiting protrusions.

11. The shock absorber according to claim 10, wherein one of the first rotating arm and the second rotating arm is provided with a channel, and a middle part of the torsion bar spring is located in the channel; and wherein a bearing or a shaft sleeve is fitted in the channel, and the middle part of the torsion bar spring is fitted in the bearing or the shaft sleeve.

12. The shock absorber according to claim 11, wherein the second rotating arm comprises an arm body, a first end cap, and a second end cap; the channel is arranged on the arm body and runs through the second rotating arm in an axial direction of the torsion bar spring; and the first end cap is coupled to the arm body and located on a side of the arm body facing away from the first rotating arm, the second end cap is coupled to the arm body and located on a side of the arm body facing the second rotating arm, wherein the second end cap is defined with a through hole for the torsion bar spring to pass through, and a second end of the torsion bar spring is coupled to the first end cap.

13. The shock absorber according to claim 12, wherein the first end cap is defined with a fourth connecting hole, the second end of the torsion bar spring is provided with a second snap slot, and the second end of the torsion bar spring is clamped in the fourth connecting hole, wherein a part, provided with the second snap slot, of the second end of the torsion bar spring passes through the fourth connecting hole, and a second snap spring is snapped in the second snap slot.

14. The shock absorber according to claim 1, wherein the first connecting hole is a circular hole, the outer expansion sleeve is fitted in the first connecting hole, at least a part of the inner expansion sleeve is frustum-shaped, and the inner expansion sleeve is at least partially fitted in the outer expansion sleeve.

15. A transportation tool, comprising:
a wheel configured as either of a front wheel and a rear wheel; and
a shock absorber, comprising:
a first rotating arm, wherein the first rotating arm is defined with a first connecting hole;
a second rotating arm pivotally coupled to the first rotating arm; and
a torsion bar spring having a first end coupled to the first rotating arm and a second end coupled to the second rotating arm,
wherein when the torsion bar spring undergoes no torsional deformation, an included angle between the first rotating arm and the second rotating arm has a set value, and the first rotating arm is coupled to a rotating shaft of the wheel,
wherein the included angle between the first rotating arm and the second rotating arm has a first critical value and a second critical value, and the set value is any value between the first critical value and the second critical value,
wherein the shock absorber further comprises an expansion sleeve; the expansion sleeve comprises an outer expansion sleeve fitted in the first connecting hole and an inner expansion sleeve fitted in the outer expansion sleeve; and the first end of the torsion bar spring is fitted in the inner expansion sleeve, and
wherein the expansion sleeve further comprises a first bolt, the inner expansion sleeve is provided with a limiting flange, the outer expansion sleeve is provided with a first threaded hole, and a second connecting hole is defined on the limiting flange, the first bolt passes through the second connecting hole and is threadedly fitted with the first threaded hole.

16. The transportation tool according to claim 15, further comprising a mudguard mounted on the second rotating arm.

17. The transportation tool according to claim 15, wherein the transportation tool comprises an electric scooter.

* * * * *